UNITED STATES PATENT OFFICE.

KURT H. MEYER, OF MUNICH, AND FRIEDRICH BERGIUS, OF HANOVER, GERMANY.

PROCESS FOR THE MANUFACTURE OF MONOVALENT PHENOLS FROM MONO-CHLORO-SUBSTITUTION PRODUCTS OF AROMATIC HYDROCARBONS.

1,062,351.     Specification of Letters Patent.     Patented May 20, 1913.

No Drawing.     Application filed November 11, 1912. Serial No. 730,788.

*To all whom it may concern:*

Be it known that we, KURT H. MEYER, chemist, and FRIEDRICH BERGIUS, chemist, citizens of the German Empire, residing at (1) Munich and (2) Hanover, in Germany, have invented certain new and useful Improvements in the Process for the Manufacture of Monovalent Phenols from Mono-Chloro-Substitution Products of Aromatic Hydrocarbons, of which the following is a specification.

In order to manufacture phenols from aromatic hydrocarbons it is necessary to sulfonate the latter and to fuse the sulfo-acids with potash or soda. As starting material for phenol, however, beside the benzene-sulfo-acid also chloro-benzene may be used. Until now, only the chloro compounds of aromatic hydrocarbons which contain, beside chlorin, another substituent, for instance a nitro group in the nucleus, could be transformed into the corresponding hydroxyl compound by treatment with diluted sodium hydroxid; but it was impossible to transform aromatic chlorin compounds in which the affinity of the chlorin atom is not weakened by a second negative substituent, into hydroxyl compounds by heating them with water or caustic alkali (NaOH) up to the boiling point. Now it has been found that these reactions, impossible under ordinary conditions, readily occur if the halogen substitution products, such as the chloro-substitution products of the hydrocarbons are heated with water under pressure to higher temperatures. The chlorin atom is thereby exchanged for the hydroxyl group. The velocity of reaction is considerably greater and the yield essentially better if caustic alkali is added to the water, to bind the hydrochloric acid.

Example I: 100 parts of chloro-benzene are heated with 400 parts of water for ten hours under pressure at 300° C. By salting out, 5 parts of phenol can be obtained from the aqueous solution. The greater part of the chloro-benzene has remained unchanged and can be submitted anew to the same treatment.

Example II: 100 parts of chloro-benzene are heated with 400 parts of soda solution of 10 per cent. strength in a closed vessel for eight hours to 280°–300° C. The yield in phenol which separates out in an almost colorless condition after acidulation with concentrated sulfuric acid, amounts to 70 parts by weight per 100 parts by weight of the chloro-benzene used. Small quantities (about 10 per cent.) of an oil having a boiling point of 240° C. are also formed.

Example III: 100 parts of α-chloro-naphthalene is mixed with 300 parts of soda solution of 10 per cent. strength, and the mixture is heated during 6 hours under pressure to 280°–300° C. Almost the whole of the α-chloro-naphthalene is thereby dissolved, showing a slight brownish color, while a small quantity remains behind in the form of a brown smeary mass. On acidulating the alkaline solution and crystallizing out, a yield of 50–60 per cent. of perfectly pure α-naphthol is obtained.

Having now described our invention what we claim as new and desire to secure by Letters Patent is:—

1. The process of manufacturing mono-valent phenols from mono-chloro-substitution products of aromatic hydrocarbons, which consists in heating the mono-chloro-substitution products with water to a high temperature under pressure.

2. The process for the manufacture of mono-valent phenols from mono-chloro-substitution products of aromatic hydrocarbons, which consists in heating said substitution products under pressure at a high temperature with water containing caustic alkali for neutralizing the hydrochloric acid that may be formed.

3. The process for the manufacture of mono-valent phenols from mono-halogen-substitution products of aromatic hydrocarbons, which consists in heating said substitution products under pressure at a high temperature with water.

In testimony whereof, we affix our signatures in presence of two witnesses.

KURT H. MEYER.
    FRIEDRICH BERGIUS.

Witnesses as to signature of Kurt H. Meyer:
    A. V. W. COTTER,
    MATHILDE K. HELD.

Witnesses as to signature of Friedrich Bergius:
    ROBERT H. HINCKLEY,
    ARTHUR J. BUNDY.